United States Patent
Pergola et al.

(10) Patent No.: US 11,480,808 B2
(45) Date of Patent: *Oct. 25, 2022

(54) FOLDED PROJECTION SYSTEM

(71) Applicant: Apple Inc., Cupertino, CA (US)

(72) Inventors: Refael Della Pergola, Jerusalem (IL); Chandra Kakani, Fremont, CA (US); Roei Remez, Tel Aviv (IL); Yuval Tsur, Herzliya (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,447

(22) Filed: Oct. 9, 2020

(65) Prior Publication Data

US 2021/0026153 A1 Jan. 28, 2021

Related U.S. Application Data

(63) Continuation of application No. 16/360,258, filed on Mar. 21, 2019, now Pat. No. 10,802,291.

(60) Provisional application No. 62/646,322, filed on Mar. 21, 2018.

(51) Int. Cl.
| | | |
|---|---|---|
| *G01B 11/25* | (2006.01) | |
| *G02B 5/18* | (2006.01) | |
| *G02B 27/28* | (2006.01) | |
| *G02B 5/04* | (2006.01) | |
| *G02B 3/00* | (2006.01) | |
| *G02B 27/00* | (2006.01) | |

(52) U.S. Cl.
CPC .......... *G02B 27/283* (2013.01); *G02B 3/005* (2013.01); *G02B 5/04* (2013.01); *G02B 5/18* (2013.01); *G02B 27/0043* (2013.01)

(58) Field of Classification Search
CPC .... G02B 2027/0123; G02B 2027/0125; G02B 27/0103; G02B 27/30; G02B 5/18; G02B 13/0065; G03B 21/14; G03B 21/147; G01B 11/25; G01B 11/254
See application file for complete search history.

(56) References Cited

U.S. PATENT DOCUMENTS

| | | |
|---|---|---|
| 9,523,852 B1 | 12/2016 | Brown et al. |
| 10,802,291 B1 | 10/2020 | Pergola et al. |
| 2007/0217030 A1* | 9/2007 | Muramatsu ............ G02B 13/18 |
| | | 359/708 |
| 2011/0037953 A1 | 2/2011 | Nizani et al. |

(Continued)

*Primary Examiner* — Ryan D Howard
(74) *Attorney, Agent, or Firm* — Robert C. Kowert; Kowert, Hood, Munyon, Rankin & Goetzel, P.C.

(57) ABSTRACT

A compact folded projection system is described that includes a laser light source, a folded lens system comprising a lens stack including two or more refractive lenses and a light folding element (e.g., a prism), and a diffractive beam splitter that includes at least one diffractive surface. The light folding element provides a "folded" optical axis for the lens system to reduce the Z-height of the projection system, for example to within a range of 1.7 to 4 millimeters (e.g., 2 millimeters in some implementations). The laser light source emits light that is refracted by the lens stack to the folding element. The folding element redirects the light to the beam splitter which replicates the light into N×M duplications or tiles to thus generate a larger field of view (FOV) than the internal FOV of the lens system.

20 Claims, 11 Drawing Sheets

(56) References Cited

U.S. PATENT DOCUMENTS

| | | | |
|---|---|---|---|
| 2012/0307378 A1* | 12/2012 | Chou | G02B 15/177 |
| | | | 359/689 |
| 2013/0038881 A1 | 2/2013 | Pesach et al. | |
| 2014/0376092 A1 | 12/2014 | Mor | |
| 2015/0226930 A1* | 8/2015 | Ishigami | G02B 15/20 |
| | | | 359/601 |
| 2016/0077338 A1 | 3/2016 | Robbins et al. | |
| 2016/0223828 A1* | 8/2016 | Abraham | G02B 27/09 |
| 2017/0374327 A1 | 12/2017 | Ouderkirk et al. | |

\* cited by examiner

FOLDED PROJECTION SYSTEM

PRIORITY INFORMATION

This application is a continuation of U.S. patent application Ser. No. 16/360,258, filed Mar. 21, 2019, which claims benefit of priority of U.S. Provisional Application Ser. No. 62/646,322, filed Mar. 21, 2018, which are hereby incorporated by reference herein their entirety.

BACKGROUND

Technical Field

This disclosure relates generally to projection systems, and more specifically to small form factor projection systems.

Description of the Related Art

The advent of small, mobile multipurpose devices such as smartphones and tablet or pad devices has resulted in a need for compact imaging components that include lens systems such as projectors and cameras. In particular, as mobile multipurpose devices have become thinner, the Z space available for imaging components has been constrained. For example, in very thin devices, imaging components may be constrained to 4 millimeters or less in the Z dimension.

SUMMARY OF EMBODIMENTS

Embodiments of the present disclosure may provide a compact folded projection system (also referred to as a projector) that may, for example, be used in small, mobile multipurpose devices such as smartphones and tablet or pad devices. Embodiments of the projection system may include a laser light source (e.g., an array of small lasers such as a vertical-cavity surface-emitting laser (VCSEL) array), a folded lens system comprising a lens stack including two or more refractive lenses or lens groups and a light folding element (e.g., a prism), and a diffractive beam splitter that includes at least one diffractive surface. The light folding element provides a "folded" optical axis for the lens system (e.g., by bending the optical axis 90 degrees) to reduce the Z-height of the projection system. The laser light source emits light (ray bundles) that are refracted by the lenses in the lens stack to the light folding element. The light folding element redirects the ray bundles to the diffractive beam splitter which replicates the ray bundles into N×M duplications. Replicating the ray bundles generates a larger field of view (FOV) than the internal FOV of the lens system.

In some embodiments, the lens stack includes two lenses with refractive power, arranged in order from the laser light source (referred to as the "object side" of the projection system) to the light folding element: a first lens with aspheric shape, referred to as a field lens, and a second lens referred to as a collimating lens. In some embodiments, the field lens has high order aspheric surfaces that correct for distortion and telecentricity in the lens system. In some embodiments, the collimating lens defines the diameter of the exit pupil, the object divergence, and the minimal spot diameter of the object. In some embodiments, the lens stack includes at least one refractive lens between the field lens and the collimating lens to further correct the image quality across the field of view of the lens system.

In some embodiments, the lens system is telecentric on the object side to make it suitable to project the array of laser light sources. In some embodiments, the diffractive beam splitter is located at the exit pupil of the lens system to avoid duplication artifacts.

The dimensions and optical characteristics of embodiments of the projection system may be dictated or constrained by the particular design requirements for the projection system. For example, the maximum Z height of the projection system may be constrained by the available Z space in a device for which the projection system is intended.

In some embodiments, the maximum Z height of the projection system may be within a range of 1.7 to 4 millimeters, and the maximum clear aperture of the lenses may be within a range of 1.5 to 3.8 mm. In some embodiments, the effective focal length (EFL) of the lens system may be within a range of 2.0 to 3.3 mm (e.g., 2.81 mm).

In some embodiments, the maximum lens clear aperture is within a range of 1.6 to 1.75 mm (e.g., 1.65 mm or 1.7 mm), and the maximum Z height is within a range of 1.75 to 2.1 mm (e.g., 2 mm).

In some embodiments, the maximum lens clear aperture is within a range of 1.65 to 1.7 mm, and the maximum Z height is within a range of 1.9 to 2.0 mm.

In some embodiments, the light folding element is a prism. In some embodiments, the prism may be composed of a plastic or glass material with a refractive index within a range of 1.45 to 1.85. In some embodiments, the refractive index of the prism is 1.7.

In some embodiments, the diffractive beam splitter includes a single active diffractive surface. In some embodiments, the active diffractive surface is located on the object side of the beam splitter (i.e., adjacent to the light folding element). In some embodiments, the active diffractive surface is located on the image side of the beam splitter. In some embodiments, the beam splitter may include two or more active diffractive surfaces.

In some embodiments, total track length (TTL) of the lens system before the folding element is within a range of 3.5 to 5 mm. In some embodiments, TTL of the lens system before the folding element is approximately 4 mm. In some embodiments, the lens system satisfies the relation:

$$0.5 <= EFL/TTL <= 1.$$

In some embodiments, effective range of the tiled FOV of the projection system is within about 15 cm to about 4 meters in front of the projection system. In some embodiments, the FOV of the projection system may be within a range of 40 to 90 degrees in the X (horizontal) direction and 30 to 50 degrees in the Y (vertical) direction. In some embodiments, the FOV of the projection system may be 70 degrees in X and 40 degrees in Y.

Figure 1:
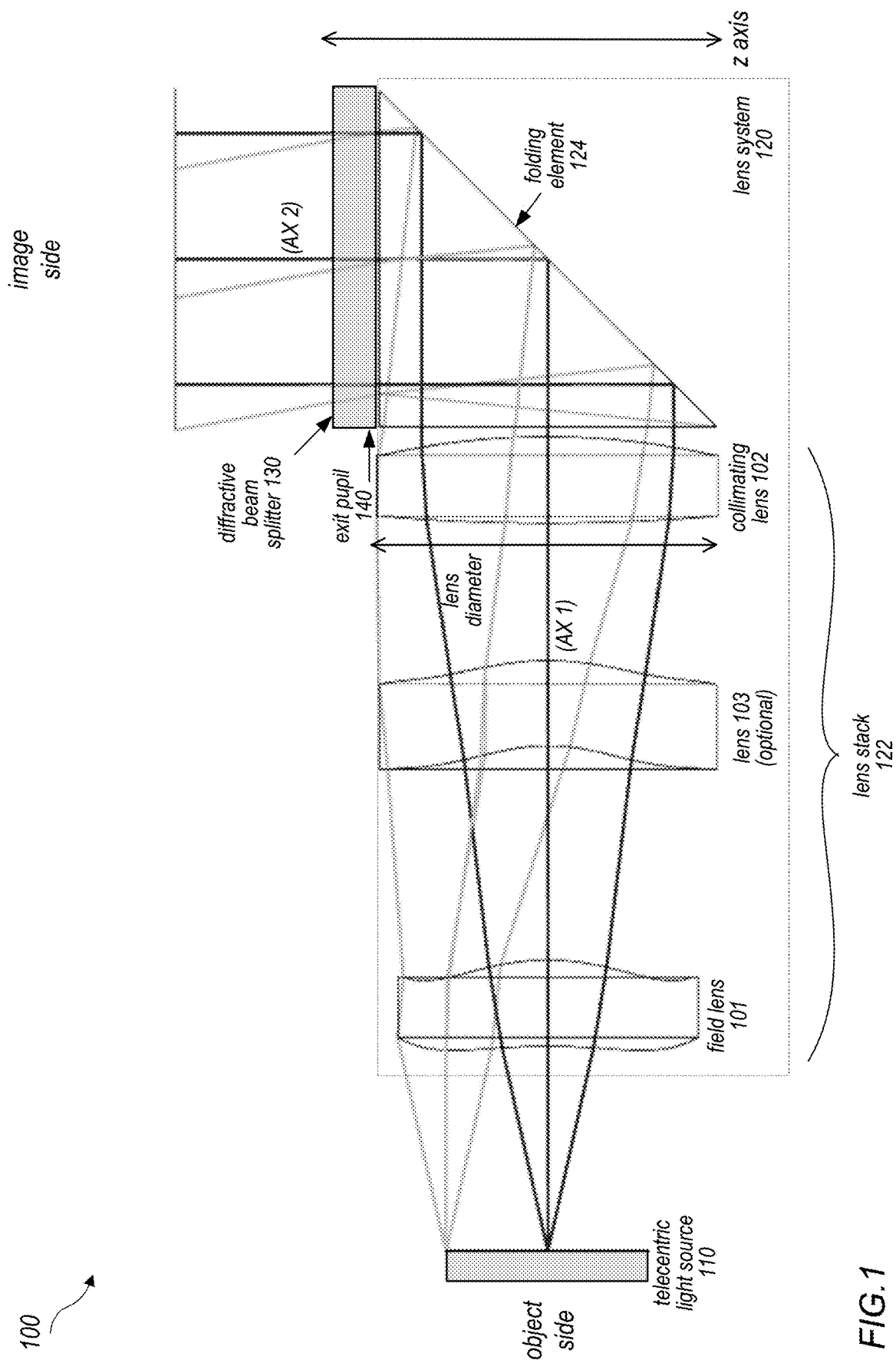
FIG. 1 illustrates components of an example compact projection system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact projection system are described that that may, for example, be used in small, mobile multipurpose devices such as smartphones and tablet or pad devices. FIG. 1 illustrates components of an example compact projection system 100, according to some embodiments. In some embodiments, projection system 100 may include a telecentric light source 110 (e.g., an array of small lasers such as a vertical-cavity surface-emitting laser (VCSEL) array), a folded lens system 120 comprising a lens stack 122 including two or more refractive lenses or lens groups and a light folding element 124 (e.g., a prism), and a diffractive beam splitter 130 that includes at least one diffractive surface. The light folding element 124 provides a "folded" optical axis for the lens system 120 (e.g., by bending the optical axis 90 degrees) to reduce the Z-height of the projection system 100. The light source 110 emits light (ray bundles) that are refracted by the lens stack 122 to the light folding element 124. The light folding element 124 redirects the ray bundles to the diffractive beam splitter 130 which replicates the ray bundles into N×M duplications that are projected onto an object or surface in front of the projection system 100. Replicating the ray bundles generates a larger field of view (FOV) than the internal FOV of the lens system 120.

In some embodiments, the lens stack 122 includes two lenses with refractive power, arranged in order from the laser light source (referred to as the "object side" of the projection system) to the light folding element: a first lens 101 with aspheric shape, referred to as a field lens, and a second lens 102 referred to as a collimating lens. In some embodiments, the field lens 101 has high order aspheric surfaces that perform corrections for distortion and telecentricity in the lens system 120. The field lens 101 also helps to control the exit pupil 140 position. In some embodiments, the collimating lens 102 defines the diameter of the exit pupil 140, the object divergence, and the minimal spot diameter of the object. In some embodiments, the lens stack 122 includes at least one refractive lens 103 between the field lens 101 and the collimating lens 102 to further correct the image quality across the field of view of the lens system 120. The collimating lens 102 (and lens 103, if present) also contribute to collimating or focusing the laser light beams to a predefined distance or infinity.

In some embodiments, lenses 101, 102 and 103 are single lenses. Alternatively, in some embodiments, at least one of lenses 101, 102, or 103 is a compound lens or lens group including two or more lenses.

In some embodiments, the object (i.e., the light source 110) may be located close to the field lens 101; this allows for minimizing the physical size of the field lens 101. In some embodiments, the lens system 120 is telecentric on the object side to make it suitable to project the array 110 of laser light sources without clipping the beams inside the lens system 120. In some embodiments, the diffractive beam splitter 130 is located at the exit pupil 140 of the lens system 120 to avoid duplication artifacts. In some embodiments, the lens system 120 is designed so that the element size near the exit pupil 140 is minimized. For example, the exit pupil 140 of the lens system 120 may be located as close as possible to the collimating lens 102 to minimize the size of the collimating lens 102. In some embodiments, the lenses may be sectioned (e.g., the lenses may be rectangular) to make the aperture rectangular, for example to meet packaging requirements.

In some embodiments, in addition to providing a short Z dimension for the projection system 100, the optical fold provided by the light folding element 124 acts to push out the exit pupil 140 to the beam splitter 130. In some embodiments, the light folding element 124 is a prism composed of a plastic or glass material with an index of refraction (diffractive index) that assists in positioning the exit pupil 140 at the diffractive beam splitter 130, more specifically at an active diffractive surface of the beam splitter 130. In some embodiments, the refractive index of the prism is within a range of 1.45 to 1.85. In some embodiments, the refractive index of the prism is 1.7. In some embodiments, the beam splitter 130 includes a single active diffractive surface. In some embodiments, the active diffractive surface is located on the object side of the beam splitter (i.e., adjacent to the light folding element 124). However, in some embodiments, the active diffractive surface is located on the image side of the beam splitter 130. In some embodiments, the beam splitter 130 may include two or more active diffractive surfaces In some embodiments, the lenses may be injection molded optical plastic lenses. In some embodiments, the lenses may be epoxy deposited glass wafer lenses, also referred to as replicated lens wafers or epoxy on glass wafer lenses. In some embodiments, the lenses may be molded glass wafers composed of low transition glass material suitable for molding. Example embodiments with two lenses and with three lenses are described for each method of lens manufacture. The two-lens embodiments may allow for generally looser tolerances for easier manufacturability, but may provide reduced off-axis performance. The three-lens embodiments may be diffraction limited, but may require tighter manufacturing tolerances.

In some embodiments, athermalization may be achieved with epoxy deposited glass wafer lenses and/or with molded glass wafer lenses so that optical properties of the lens system 120 do not change with variations in temperature.

Figure 11:
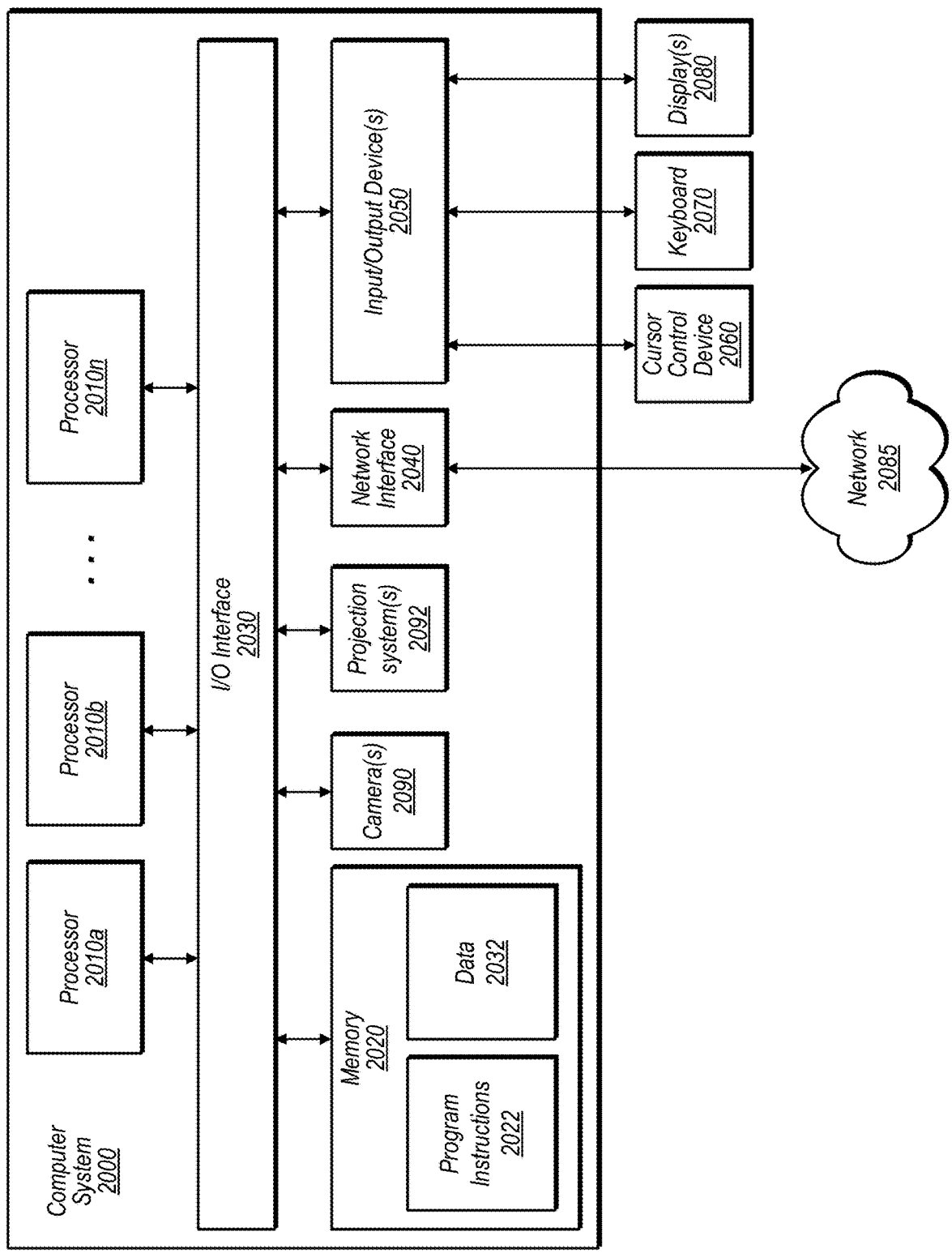
FIG. 11 illustrates an example computer system that may be used in embodiments.

Embodiments of the projection system 100 may be implemented in a small package size suitable for use in small and/or mobile multipurpose devices such as cell phones, smartphones, pad or tablet computing devices, laptop, netbook, notebook, subnotebook, and ultrabook computers, and so on. In particular, the folded lens system design using the folding element 124 to fold the optical axis provides a shorter Z-axis height for the projection system 100 than is achievable with non-folded lens designs, which makes the projection system 100 suitable for use in thin devices where Z space is at a premium. FIG. 11 illustrates an example device that may include one or more projection systems 100 as described herein. However, note that aspects of the projection system 100 (e.g., the light source 110, lens stack 122, prism 124, and diffraction beam splitter 130) may be scaled up or down to provide projection systems 100 with larger or smaller package sizes.

Figure 2:
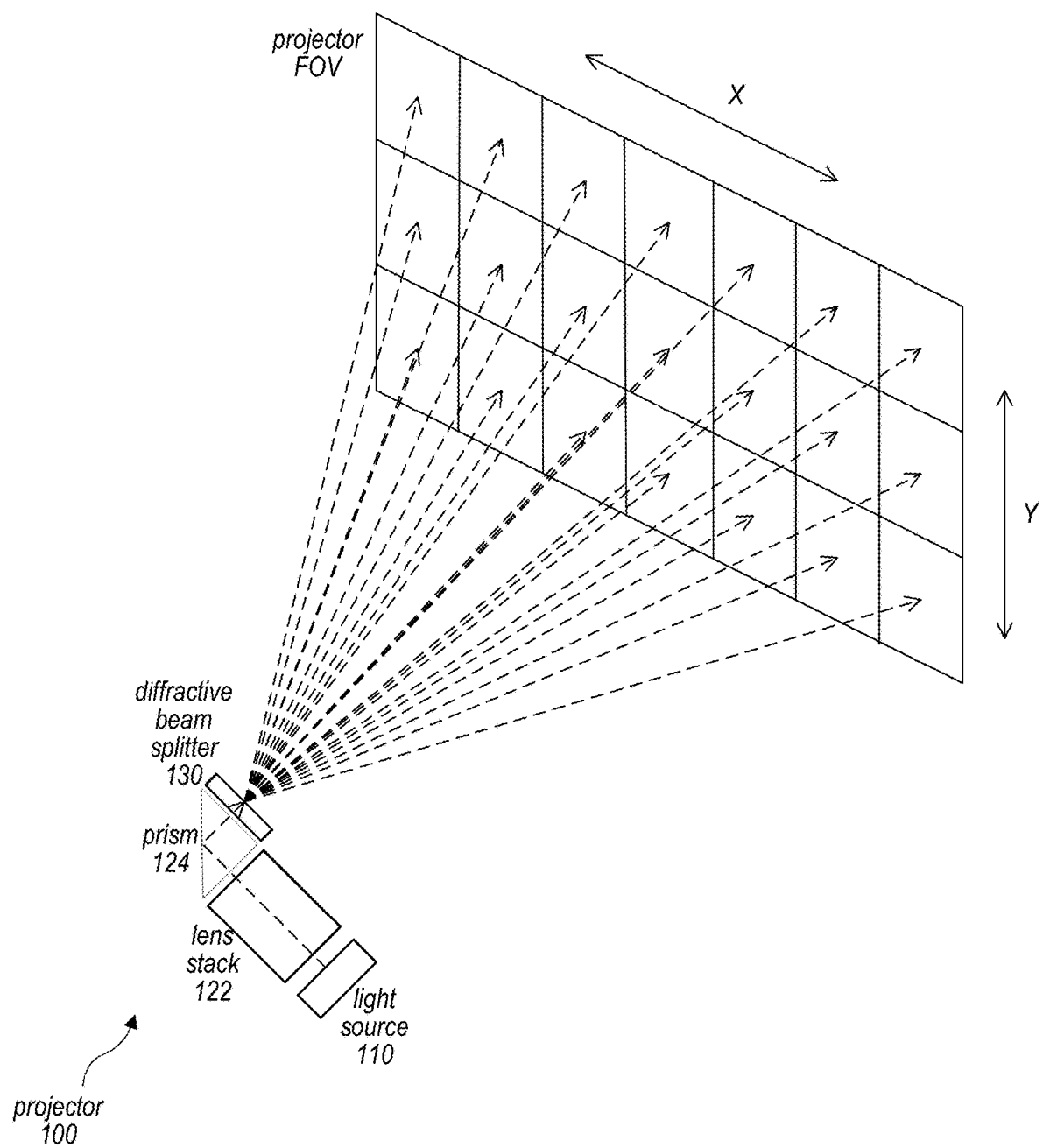
FIG. 2 illustrates the diffractive beam splitter replicating the field of view of the lens system to produce a larger field of view for the projection system, according to some embodiments.

FIG. 2 illustrates the diffractive beam splitter replicating the field of view of the lens system to produce a larger field of view for the projection system 100, according to some embodiments. The light source 110 emits light (ray bundles) that are refracted by the lens stack 122 to the light folding element 124. The light may be visible, infrared, near-infrared, or other wavelengths of light depending on the particular application. The light folding element 124 redirects the ray bundles to the diffractive beam splitter 130 which replicates the ray bundles into N×M duplications that are projected onto an object or surface in front of the projection system 100. Replicating the ray bundles generates a larger field of view (FOV) for the projector than the internal FOV of the lens system 120. For example, if the internal FOV is about 10 degrees, the beam splitter 130 may replicate the FOV 7× in the X direction and 3× in the Y direction to produce 21 "tiles" that provide a 70 degree FOV in the X direction and a 40 degree FOV in the Y direction for the projector 100.

Figure 3:
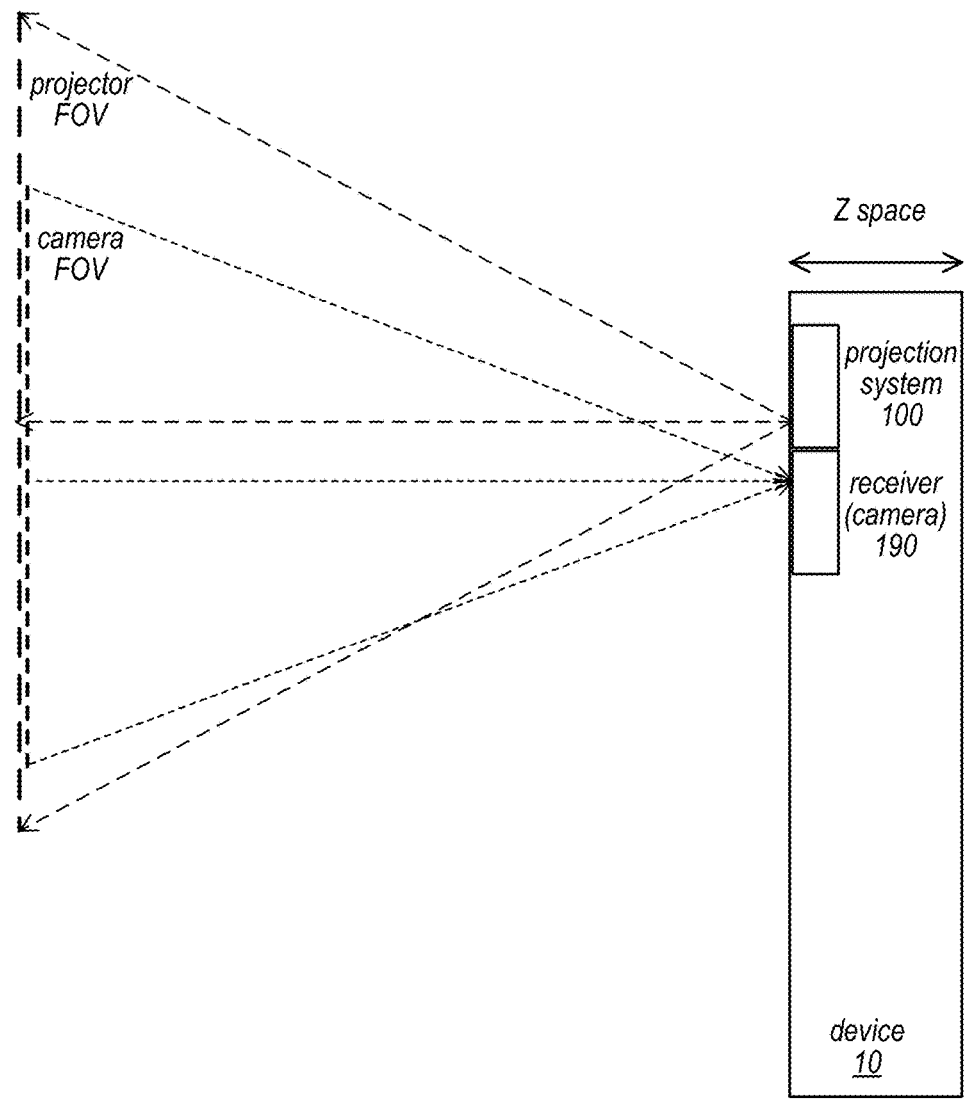
FIG. 3 illustrates a device that includes a camera and a projection system as illustrated in FIGS. 1 and 2, according to some embodiments.

FIG. 3 illustrates a device that includes a camera and a projection system as illustrated in FIGS. 1 and 2, according to some embodiments. A device 10 (e.g., a mobile multipurpose device such as a smartphone, pad, or tablet device) may include a projection system 100 as described above with respect to FIGS. 1 and 2 that projects replicated laser light to a projector FOV as described in reference to FIG. 2. Device 10 may also include a camera 190 that acts as a receiver to capture depth images of the field illuminated by the projection system 100. A depth image includes pixels with range or depth information instead of color information. As an example use case, an object may be located at some distance (e.g., 4 meters or less) in front of the device 10. The projector 100 may illuminate the object with light emitted by the light source 110 and replicated by the beam splitter 130. The camera 190 captures depth image(s) of the object. The depth information may, for example, be used in object recognition applications.

As shown in FIG. 3, in some embodiments, the projector FOV may overlap the camera FOV. Generally stated, the camera FOV should be less than or equal to the projector FOV so that the entire FOV of the camera is covered by the FOV of the projector. Thus, if projecting a pattern, the entire FOV of the camera is covered by the projected pattern. In addition, the distance between the projector 100 and the camera 190 may result in parallax at some distances; thus, the projector FOV should cover a region large enough to account for parallax Projection System Dimensions and Optical Characteristics The dimensions and optical characteristics of embodiments of the projection system 100 may be dictated or constrained by the particular design requirements for the projection system 100. For example, the maximum Z height of the projection system 100 may be constrained by the available Z space in a device for which the projection system 100 is intended. As shown in FIG. 1, the Z height of the projection system 100 includes the maximum clear aperture of the lenses in the lens system 120 and the thickness of the beam splitter 130, which adds to the Z height of the projection system 100.

In some embodiments, the maximum Z height of the projection system 100 may be within a range of 1.7 to 4 millimeters, and the maximum clear aperture of the lenses may be within a range of 1.5 to 3.8 mm. In some embodiments, the effective focal length (EFL) of the lens system 120 may be within a range of 2.0 to 3.3 mm (e.g., 2.81 mm).

In some embodiments, the maximum lens clear aperture is within a range of 1.6 to 1.75 mm (e.g., 1.65 mm or 1.7 mm), and the maximum Z height is within a range of 1.75 to 2.1 millimeters (e.g., 2 mm).

In some embodiments, the maximum lens clear aperture is within a range of 1.65 to 1.7 mm, and the maximum Z height is within a range of 1.9 to 2.0 mm.

In some embodiments, the light folding element 124 is a prism composed of a plastic or glass material with a diffractive index within a range of 1.45 to 1.85. In some embodiments, the diffractive index of the prism is 1.7.

In some embodiments, the diffractive beam splitter 130 includes a single active diffractive surface. In some embodiments, the active diffractive surface is located on the object side of the beam splitter 130 (i.e., adjacent to the light folding element 120). In some embodiments, the active diffractive surface is located on the image side of the beam splitter 130. In some embodiments, the beam splitter 130 may include two or more active diffractive surfaces.

In some embodiments, total track length (TTL) of the lens system 120 before the folding element 122 (i.e., the length of AX1 in FIG. 1) is within a range of 3.5 to 5 mm. In some embodiments, TTL of the lens system 120 before the folding element 122 is approximately 4 mm. In some embodiments, the lens system 120 satisfies the relation:

$$0.5 <= EFL/TTL <= 1.$$

Referring to FIGS. 2 and 3, in some embodiments, the effective range of the tiled FOV of the projector 100 is within about 15 cm to about 4 meters in front of the device. In some embodiments, the FOV of the projection system may be within a range of 40 to 90 degrees in the X (horizontal) direction and 30 to 60 degrees in the Y (vertical) direction. In some embodiments, the FOV of the projection system may be 70 degrees in X and 40 degrees in Y.

Example Embodiments

FIGS. 4 through 9 provide example embodiments of compact folded projection systems that include lens stacks with two lenses and with three lenses for each method of lens manufacture (injection molded lenses, epoxy on glass lenses, and molded glass wafer lenses). The two-lens embodiments may allow for generally looser tolerances for easier manufacturability, but may provide reduced off-axis performance. The three-lens embodiments may be diffraction limited, but may require tighter manufacturing tolerances. In some embodiments, athermalization may be achieved with epoxy deposited glass wafer lenses and/or molded glass wafer lenses so that optical properties of the lens system do not change with variations in temperature.

For each example embodiment, two Tables are provided that provide example values for various optical and physical parameters of the respective projection system. The Tables may be referred to as providing an optical prescription for the respective projection system. The first Table lists the surface type, radius of curvature, and material for the lenses, the material for the prism, and the thickness or separation/spacing for the elements in the respective projection system from the object (i.e., the light source) to the image (i.e., the illuminated field). "Stop" corresponds to the exit pupil. Aspheric coefficients for the surfaces of the lens elements in the respective projection system are provided in the second Table.

Note that these example embodiments are given as illustrative examples, and variations on these examples are possible while still achieving similar results.

Figure 4:
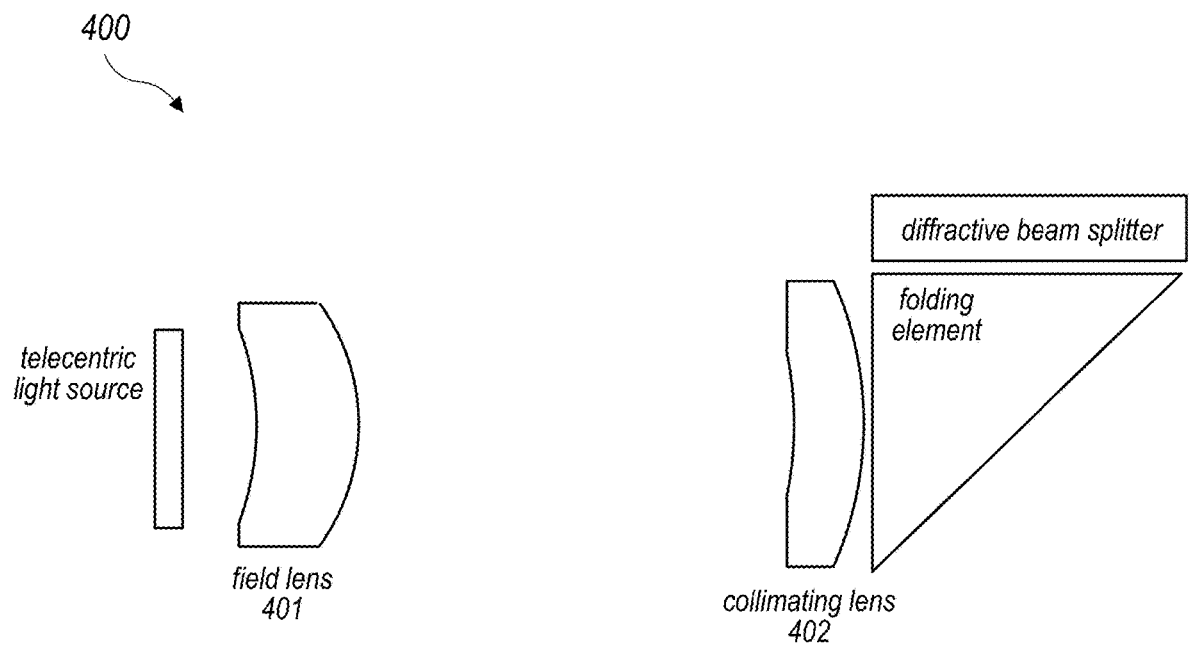
FIG. 4 illustrates an example embodiment of a lens stack in a folded lens system that includes two injection molded lenses.

FIG. 4 illustrates an example embodiment of a lens stack in a folded projection system 400 that includes two injection molded lenses, field lens 401 and collimating lens 402. The field lens 401 has high order aspheric surfaces that perform corrections for distortion and telecentricity in the lens system. The field lens 401 also helps to control the exit pupil position. The collimating lens 402 defines the diameter of the exit pupil, the object divergence, and the minimal spot diameter of the object. Tables 1 and 2 provide an optical prescription for projection system 400. In the Tables, S4 corresponds to the object side surface of lens 401, S3 corresponds to the image side surface of lens 401, S2 corresponds to the object side surface of lens 402, and S1 corresponds to the image side surface of lens 402.

TABLE 1

| Surface # | Surface Name | Surface Type | Y Radius | Thickness or Separation | Material |
|---|---|---|---|---|---|
| Object | | | Infinity | 0.0000 | |
| 1 | | | Infinity | 0.4500 | |
| 2 | S4 | Aspheric | −1.8895 | 0.6000 | 660000.20 |
| 3 | S3 | Aspheric | −1.1960 | 2.5159 | |
| 4 | S2 | Aspheric | −17.3575 | 0.4341 | 660000.20 |
| 5 | S1 | Aspheric | −2.2769 | 0.0500 | |
| 6 | | | Infinity | 0.0000 | |
| 7 | | | Infinity | 0.0000 | |
| 8 | | | Infinity | 1.6500 | 700000.30 |
| 9 | | | Infinity | 0.0000 | |
| 10 | | | Infinity | 0.0000 | |
| Stop | | | Infinity | 0.0000 | |
| 12 | | | Infinity | 900.0000 | |
| Image | | | Infinity | 0.0000 | |

TABLE 2

| | S4 | S3 | S2 | S1 |
|---|---|---|---|---|
| Conic Constant (K) | 0.0000 | 0.0000 | 0.0000 | −0.5228 |
| $4^{th}$ Order Coefficient (A) | −0.0291 | 0.0358 | 0.0000 | 0.0000 |
| $6^{th}$ Order Coefficient (B) | −0.5671 | −0.1324 | 0.0000 | 0.0000 |
| $8^{th}$ Order Coefficient (C) | 1.1567 | 0.1991 | 0.0000 | 0.0000 |
| $10^{th}$ Order Coefficient (D) | −0.2417 | −0.0462 | 0.0000 | 0.0000 |

Figure 5:
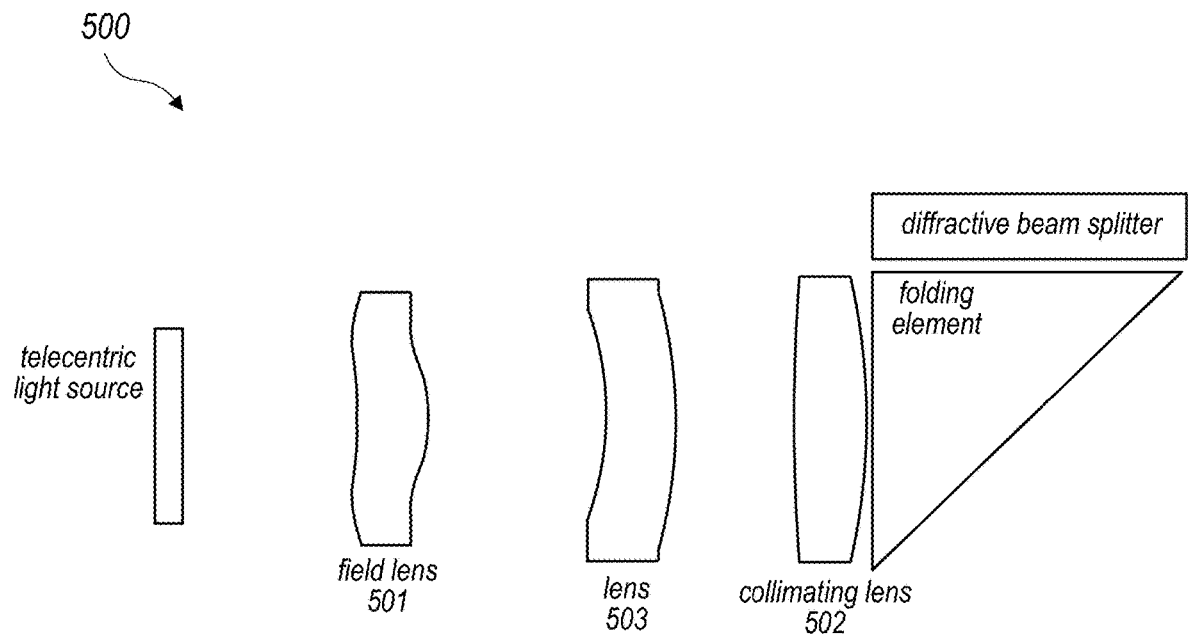
FIG. 5 illustrates an example embodiment of a lens stack in a folded lens system that includes three injection molded lenses.

FIG. 5 illustrates an example embodiment of a lens stack in a folded projection system 500 that includes three injection molded lenses, field lens 501, collimating lens 502, and a third lens 503 located between lenses 501 and 502. The field lens 501 has high order aspheric surfaces that perform corrections for distortion and telecentricity in the lens system. The field lens 501 also helps to control the exit pupil position. The collimating lens 502 defines the diameter of the exit pupil, the object divergence, and the minimal spot diameter of the object. Lens 503 further corrects the image quality across the field of view of the lens system. Tables 3 and 4 provide an optical prescription for projection system 500. In the Tables, S6 corresponds to the object side surface of lens 501, S5 corresponds to the image side surface of lens 501, S4 corresponds to the object side surface of lens 503, S3 corresponds to the image side surface of lens 503, S2 corresponds to the object side surface of lens 502, and S1 corresponds to the image side surface of lens 502.

TABLE 3

| Surface # | Surface Name | Surface Type | Y Radius | Thickness or Separation | Material |
|---|---|---|---|---|---|
| Object | | | Infinity | 0.0000 | |
| 1 | | | Infinity | 1.0047 | |
| 2 | S6 | Aspheric | −3.0375 | 0.4229 | 660000.20 |
| 3 | S5 | Aspheric | −1.1317 | 1.0540 | |
| 4 | S4 | Aspheric | −0.8910 | 0.4173 | 660000.20 |
| 5 | S3 | Aspheric | −1.2689 | 0.6760 | |
| 6 | S2 | Aspheric | 9.8363 | 0.4252 | 660000.20 |
| 7 | S1 | Aspheric | −3.9180 | 0.0500 | |
| 8 | | | Infinity | 0.0000 | |
| 9 | | | Infinity | 0.0000 | |

TABLE 3-continued

| Surface # | Surface Name | Surface Type | Y Radius | Thickness or Separation | Material |
|---|---|---|---|---|---|
| 10 | | | Infinity | 1.6500 | 700000.30 |
| 11 | | | Infinity | 0.0000 | |
| 12 | | | Infinity | 0.0000 | |
| Stop | | | Infinity | 0.0000 | |
| 14 | | | Infinity | 900.0000 | |
| Image | | | Infinity | 0.0000 | |

TABLE 4

| | S6 | S5 | S4 | S3 | S2 | S1 |
|---|---|---|---|---|---|---|
| Conic Constant (K) | 0.0000 | 0.0000 | 0.0000 | 0.0000 | 0.0000 | 16.5847 |
| $4^{th}$ Order Coefficient (A) | 0.0707 | 0.2503 | 1.1905 | 0.5362 | 0.0000 | 0.0000 |
| $6^{th}$ Order Coefficient (B) | 1.5787 | 0.8559 | −0.5918 | 0.0508 | 0.0000 | 0.0792 |
| $8^{th}$ Order Coefficient (C) | −2.3545 | 0.0650 | 0.0837 | −0.3944 | 0.0000 | −0.0783 |
| $10^{th}$ Order Coefficient (D) | 1.3783 | −0.3166 | 0.3163 | 0.0712 | 0.0000 | 0.1216 |

Figure 6:
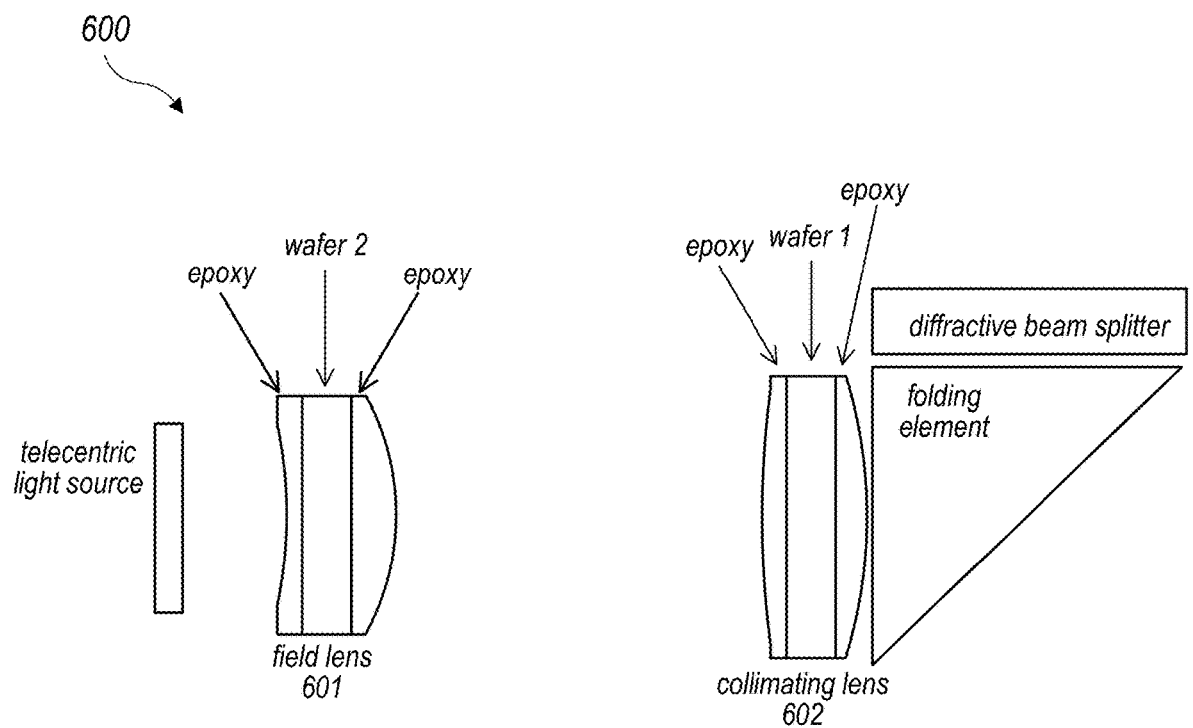
FIG. 6 illustrates an example embodiment of a lens stack in a folded lens system that includes two epoxy on glass lenses.

FIG. 6 illustrates an example embodiment of a lens stack in a folded projection system 600 that includes two epoxy on glass lenses, field lens 601 and collimating lens 602. The field lens 601 has high order aspheric surfaces that perform corrections for distortion and telecentricity in the lens system. The field lens 601 also helps to control the exit pupil position. The collimating lens 602 defines the diameter of the exit pupil, the object divergence, and the minimal spot diameter of the object. Tables 5 and 6 provide an optical prescription for projection system 600. In the Tables, S4 corresponds to the object side surface of lens 601, S3 corresponds to the image side surface of lens 601, S2 corresponds to the object side surface of lens 602, and S1 corresponds to the image side surface of lens 602.

TABLE 5

| Surface # | Surface Name | Surface Type | Y Radius | Thickness or Separation | Material |
|---|---|---|---|---|---|
| Object | | | Infinity | 0.0000 | |
| 1 | | | Infinity | 0.6000 | |
| 2 | S4 | Aspheric | −4.0585 | 0.1000 | 520000.54 |
| 3 | | | Infinity | 0.0000 | 520000.54 |
| 4 | Wafer 2 | | Infinity | 0.3000 | 510000.56 |
| 5 | | | Infinity | 0.2634 | 520000.54 |
| 6 | S3 | Aspheric | −1.4056 | 2.1886 | |
| 7 | | | Infinity | 0.0000 | |
| 8 | S2 | Aspheric | 9.4122 | 0.1445 | 520000.54 |
| 9 | | | Infinity | 0.0000 | 520000.54 |
| 10 | Wafer 1 | | Infinity | 0.3000 | 510000.56 |
| 11 | | | Infinity | 0.1897 | 520000.54 |
| 12 | S1 | Aspheric | −2.5743 | 0.0500 | |
| 13 | | | Infinity | 1.6000 | 700000.30 |
| 14 | | | Infinity | 0.0000 | |
| Stop | | | Infinity | 0.0000 | |
| 16 | | | Infinity | 900.0000 | |
| Image | | | Infinity | 0.0000 | |

TABLE 6

| | S4 | S3 | S2 | S1 |
|---|---|---|---|---|
| Conic Constant (K) | 0.0000 | 0.0000 | 0.0000 | 0.0000 |
| $4^{th}$ Order Coefficient (A) | −0.0744 | 0.0021 | 0.0379 | 0.0358 |
| $6^{th}$ Order Coefficient (B) | −0.4297 | 0.1582 | −0.0015 | −0.0034 |
| $8^{th}$ Order Coefficient (C) | 5.9941 | −0.3633 | 0.0615 | 0.0758 |
| $10^{th}$ Order Coefficient (D) | −26.8261 | 0.4695 | −0.0798 | −0.1129 |
| $12^{th}$ Order Coefficient (E) | 56.6720 | 0.0000 | 0.0595 | 0.0907 |
| $14^{th}$ Order Coefficient (F) | −43.8113 | 0.0000 | 0.0000 | 0.0000 |

Figure 7:
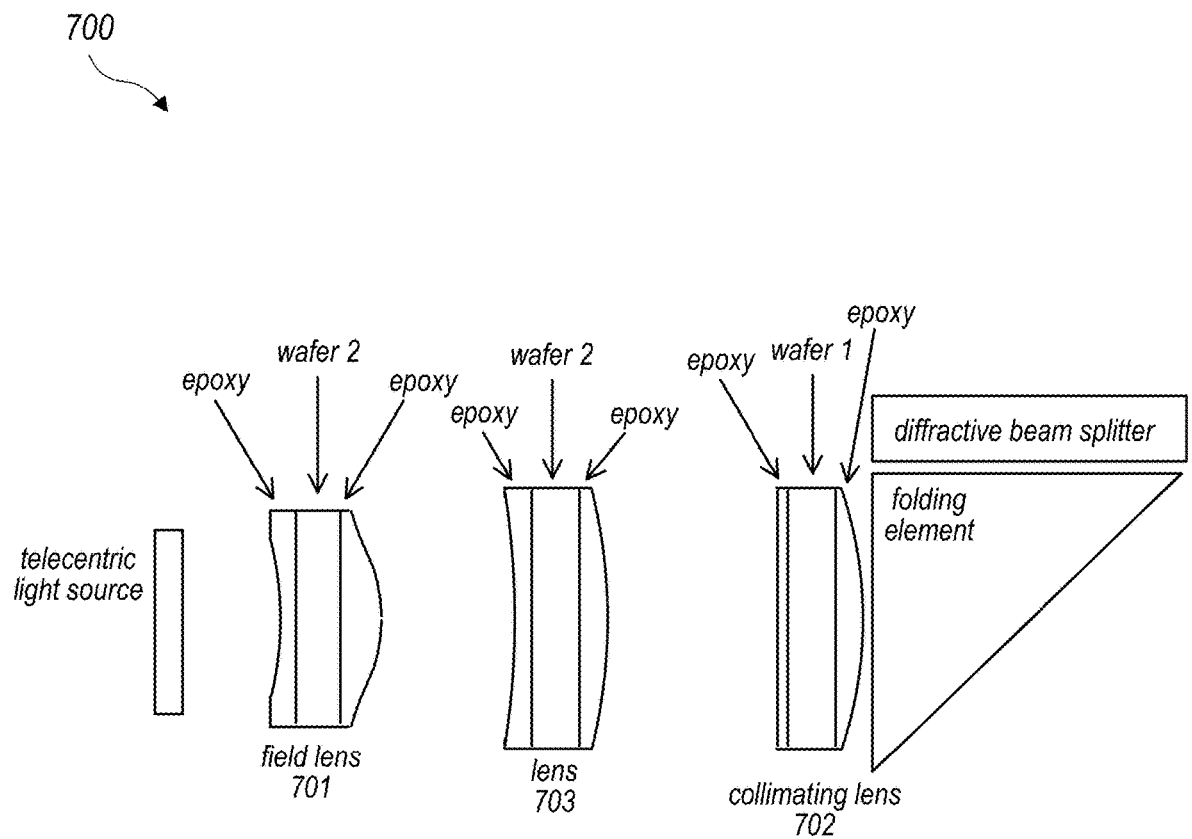
FIG. 7 illustrates an example embodiment of a lens stack in a folded lens system that includes three epoxy on glass lenses.

FIG. 7 illustrates an example embodiment of a lens stack in a folded lens system that includes three epoxy on glass lenses, field lens 701, collimating lens 702, and a third lens 703 located between lenses 701 and 702. The field lens 701 has high order aspheric surfaces that perform corrections for distortion and telecentricity in the lens system. The field lens 701 also helps to control the exit pupil position. The collimating lens 702 defines the diameter of the exit pupil, the object divergence, and the minimal spot diameter of the object. Lens 703 further corrects the image quality across the field of view of the lens system. Tables 7 and 8 provide an optical prescription for projection system 700. In the Tables, S6 corresponds to the object side surface of lens 701, S5 corresponds to the image side surface of lens 701, S4 corresponds to the object side surface of lens 703, S3 corresponds to the image side surface of lens 703, S2 corresponds to the object side surface of lens 702, and S1 corresponds to the image side surface of lens 702.

TABLE 7

| Surface # | Surface Name | Surface Type | Y Radius | Thickness or Separation | Material |
|---|---|---|---|---|---|
| Object | | | Infinity | 0.0000 | |
| 1 | | | Infinity | 0.0000 | |
| 2 | | | Infinity | 0.6000 | |
| 3 | S6 | Aspheric | −1.2686 | 0.0781 | 520000.54 |
| 4 | | | Infinity | 0.0000 | 520000.54 |
| 5 | Wafer 3 | | Infinity | 0.3000 | 520000.56 |
| 6 | | | Infinity | 0.2624 | 520000.54 |
| 7 | S5 | Aspheric | −0.8121 | 0.8557 | |
| 8 | S4 | Aspheric | −1.4648 | 0.1000 | 520000.54 |
| 9 | | | Infinity | 0.0000 | 520000.54 |
| 10 | Wafer 2 | | Infinity | 0.3000 | 520000.56 |
| 11 | | | Infinity | 0.1963 | 520000.54 |
| 12 | S3 | Aspheric | −1.9663 | 1.0802 | |
| 13 | S2 | Aspheric | 19.7654 | 0.0750 | 520000.54 |
| 14 | | | Infinity | 0.0000 | 520000.54 |
| 15 | Wafer 1 | | Infinity | 0.3000 | 520000.56 |
| 16 | | | Infinity | 0.1803 | 520000.54 |
| 17 | S1 | Aspheric | −2.8309 | 0.0500 | |
| 18 | | | Infinity | 1.6000 | 700000.30 |
| 19 | | | Infinity | 0.0000 | |
| Stop | | | Infinity | 0.0000 | |
| Image | | | Infinity | 900.0000 | |

TABLE 8

|  | S6 | S5 | S4 | S3 | S2 | S1 |
|---|---|---|---|---|---|---|
| Conic Constant (K) | 0.0000 | 0.0000 | 0.0000 | 0.0000 | 0.0000 | 0.0000 |
| 4$^{th}$ Order Coefficient (A) | 0.3074 | 0.5903 | 1.1321 | 0.5025 | 0.0888 | 0.0377 |
| 6$^{th}$ Order Coefficient (B) | 3.5020 | 1.1194 | −1.6893 | −0.4681 | −0.2078 | −0.0566 |
| 8$^{th}$ Order Coefficient (C) | −15.3029 | −1.6140 | 1.6085 | −0.1553 | 0.1569 | −0.0444 |
| 10$^{th}$ Order Coefficient (D) | 35.9089 | 1.2242 | −1.0093 | 0.1718 | −0.1281 | 0.1095 |
| 12$^{th}$ Order Coefficient (E) | −47.1629 | 0.0000 | 0.0000 | 0.0000 | −0.1212 | −0.1641 |
| 14$^{th}$ Order Coefficient (F) | 24.1734 | 0.0000 | 0.0000 | 0.0000 | 0.0000 | 0.0000 |

Figure 8:
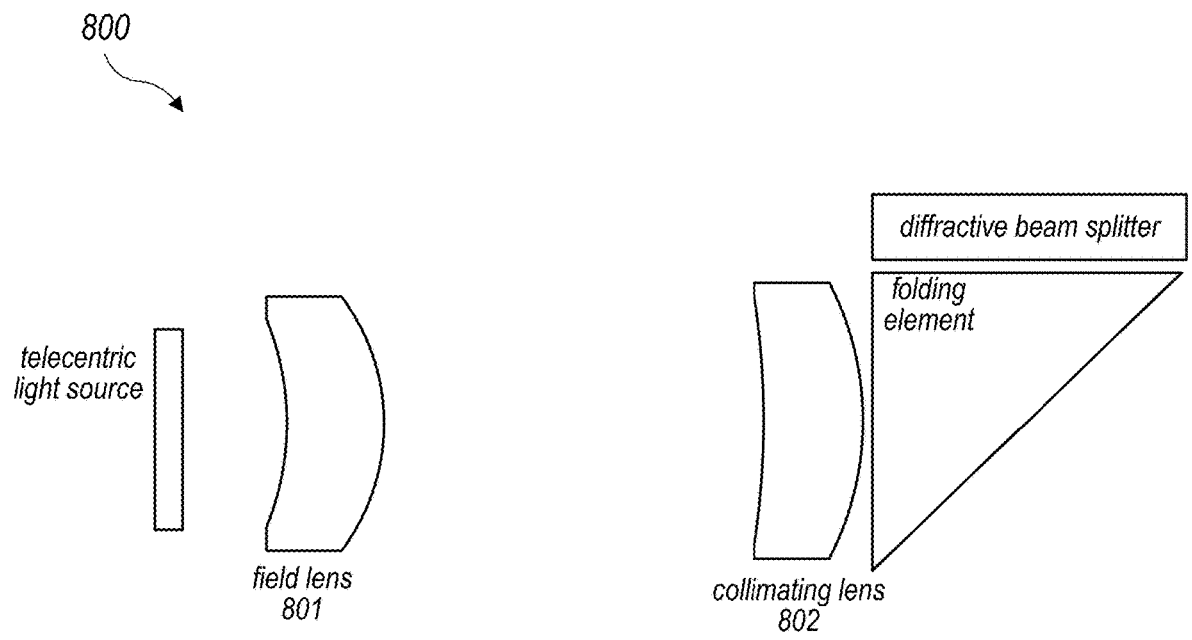
FIG. 8 illustrates an example embodiment of a lens stack in a folded lens system that includes two molded glass wafer lenses.

FIG. 8 illustrates an example embodiment of a lens stack in a folded lens system that includes two molded glass wafer lenses, field lens 801 and collimating lens 802. The field lens 801 has high order aspheric surfaces that perform corrections for distortion and telecentricity in the lens system. The field lens 801 also helps to control the exit pupil position. The collimating lens 802 defines the diameter of the exit pupil, the object divergence, and the minimal spot diameter of the object. Tables 9 and 10 provide an optical prescription for projection system 800. In the Tables, S4 corresponds to the object side surface of lens 801, S3 corresponds to the image side surface of lens 801, S2 corresponds to the object side surface of lens 802, and S1 corresponds to the image side surface of lens 802.

TABLE 9

| Surface # | Surface Name | Surface Type | Y Radius | Thickness or Separation | Material |
|---|---|---|---|---|---|
| Object |  |  | Infinity | 0.6000 |  |
| 1 | S4 | Aspheric | −2.2147 | 0.6000 | 669000.31 |
| 2 | S3 | Aspheric | −1.2653 | 2.2999 |  |
| 3 | S2 | Aspheric | −6.9504 | 0.6000 | 669000.31 |
| 4 | S1 | Aspheric | −2.1377 | 0.0500 |  |
| 5 |  |  | Infinity | 0.0000 |  |
| 6 |  |  | Infinity | 0.0000 |  |
| 7 |  |  | Infinity | 1.6000 | 700000.30 |
| 8 |  |  | Infinity | 0.0000 |  |
| 9 |  |  | Infinity | 0.0000 |  |
| Stop |  |  | Infinity | 0.0000 |  |
| 11 |  |  | Infinity | 900.0000 |  |
| Image |  |  | Infinity | 0.0000 |  |

TABLE 10

|  | S4 | S3 | S2 | S1 |
|---|---|---|---|---|
| Conic Constant (K) | 0.0000 | 0.0000 | 0.0000 | 0.0000 |
| 4$^{th}$ Order Coefficient (A) | −0.1395 | −0.0138 | −0.0067 | 0.0018 |
| 6$^{th}$ Order Coefficient (B) | −0.2603 | −0.0529 | −0.0266 | −0.0189 |
| 8$^{th}$ Order Coefficient (C) | 0.9809 | 0.1276 | 0.0726 | 0.0482 |
| 10$^{th}$ Order Coefficient (D) | −1.0504 | −0.1000 | −0.0765 | −0.0456 |

Figure 9:
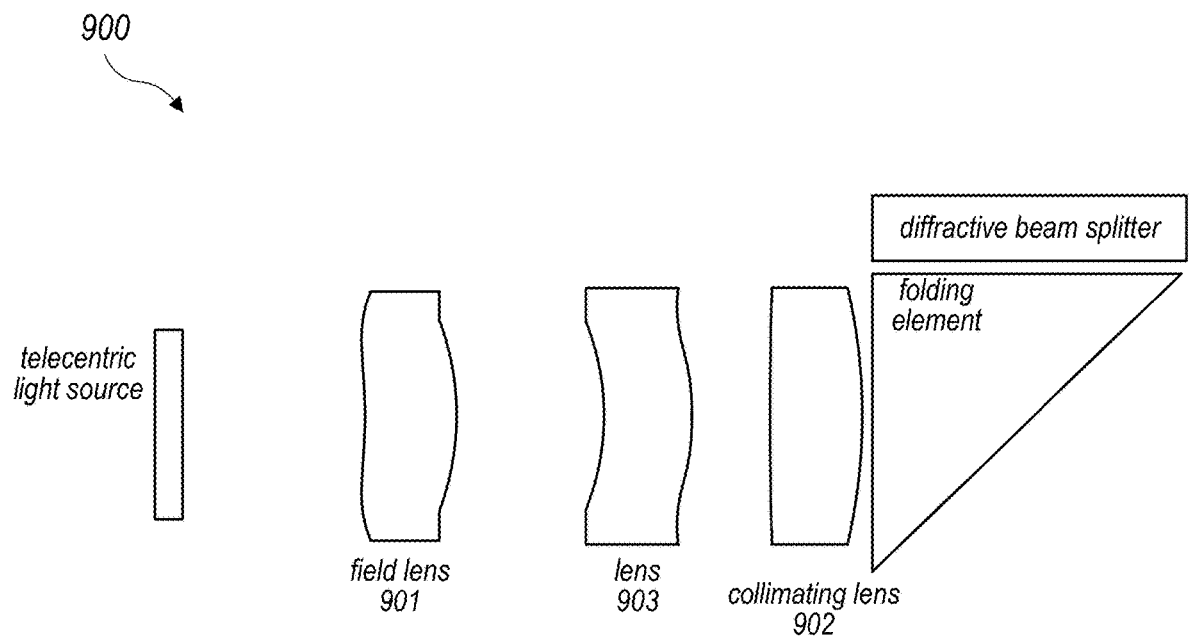
FIG. 9 illustrates an example embodiment of a lens stack in a folded lens system that includes three molded glass wafer lenses.

FIG. 9 illustrates an example embodiment of a lens stack in a folded lens system that includes three molded glass wafer lenses, field lens 901, collimating lens 902, and a third lens 903 located between lenses 901 and 902. The field lens 901 has high order aspheric surfaces that perform corrections for distortion and telecentricity in the lens system. The field lens 901 also helps to control the exit pupil position. The collimating lens 902 defines the diameter of the exit pupil, the object divergence, and the minimal spot diameter of the object. Lens 903 further corrects the image quality across the field of view of the lens system. Tables 11 and 12 provide an optical prescription for projection system 900. In the Tables, S6 corresponds to the object side surface of lens 901, S5 corresponds to the image side surface of lens 901, S4 corresponds to the object side surface of lens 903, S3 corresponds to the image side surface of lens 903, S2 corresponds to the object side surface of lens 902, and S1 corresponds to the image side surface of lens 902.

TABLE 11

| Surface # | Surface Name | Surface Type | Y Radius | Thickness or Separation | Material |
|---|---|---|---|---|---|
| Object |  |  | Infinity | 1.1519 |  |
| 1 | S6 | Aspheric | −7.0998 | 0.6000 | 669000.31 |
| 2 | S5 | Aspheric | −1.2954 | 0.9317 |  |
| 3 | S4 | Aspheric | −0.9718 | 0.5599 | 669000.31 |
| 4 | S3 | Aspheric | −1.5592 | 0.5039 |  |
| 5 | S2 | Aspheric | 19.2484 | 0.5919 | 669000.31 |
| 6 | S1 | Aspheric | −4.0415 | 0.0500 |  |
| 7 |  |  | Infinity | 1.6000 | 700000.30 |
| 8 |  |  | Infinity | 0.0000 |  |
| Stop |  |  | Infinity | 0.0000 |  |
| 10 |  |  | Infinity | 900.0000 |  |
| Image |  |  | Infinity | 0.0000 |  |

TABLE 12

|  | S6 | S5 | S4 | S3 | S2 | S1 |
|---|---|---|---|---|---|---|
| Conic Constant (K) | 0.0000 | 0.0000 | 0.0000 | 0.0000 | 0.0000 | 18.9357 |
| 4$^{th}$ Order Coefficient (A) | 0.0000 | 0.1440 | 0.8917 | 0.3662 | 0.0000 | 0.0000 |
| 6$^{th}$ Order Coefficient (B) | 0.3325 | 0.3221 | −0.3155 | 0.0064 | 0.0000 | 0.0694 |
| 8$^{th}$ Order Coefficient (C) | 0.0000 | −0.2634 | 0.1826 | 0.0372 | 0.0000 | −0.0823 |
| 10$^{th}$ Order Coefficient (D) | 0.0000 | 0.6639 | 0.0260 | −0.1440 | 0.0000 | 0.1385 |

Example Flowchart

Figure 10:
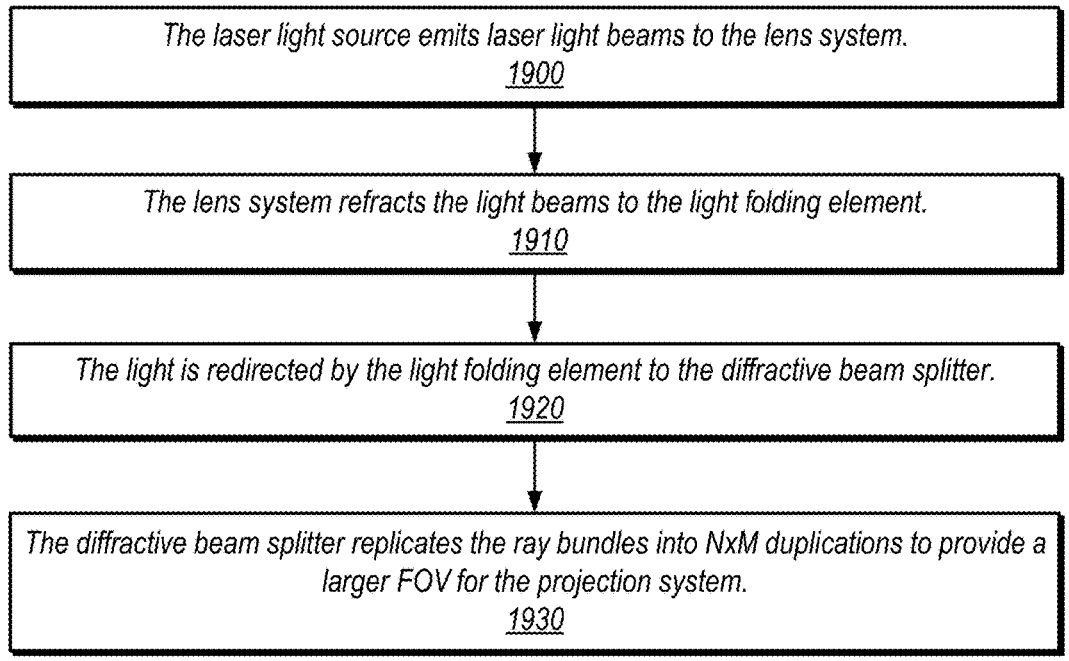
FIG. 10 is a high-level flowchart of a method of operation for a projection system as illustrated in FIGS. 1 through 9, according to some embodiments.

FIG. 10 is a high-level flowchart of a method of operation for a projection system as illustrated in FIGS. 1 through 9, according to some embodiments. As indicated at 1900, the laser light source emits laser light beams to the lens system. As indicated at 1910, the light is redirected by the first prism to a second axis. As indicated at 1920, the lens system refracts the light beams to the light folding element (e.g., a prism). As indicated at 1930, the light is redirected by the light folding element to the diffractive beam splitter. As indicated at 1940, the diffractive beam splitter replicates the ray bundles into N×M duplications to provide a larger FOV for the projection system.

In some embodiments, the components of the projection system referred to in FIG. 10 may be configured as illustrated in any of FIGS. 1 through 9. However, note that variations on the examples given in the Figures are possible while achieving similar optical results.

Example Computing Device

FIG. 11 illustrates an example computing device, referred to as computer system 2000, that may include or host embodiments of a projection system as illustrated in FIGS. 1 through 10. In addition, computer system 2000 may implement methods for controlling operations of the projection system and a camera that captures depth images from a field illuminated by the projection system, and/or for performing processing of the depth images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more projection systems 2092 as described above with respect to FIGS. 1 through 10 which may also be coupled to I/O interface 2030. Computer system 2000 may also include one or more cameras 2090, for example a camera as described above with respect to FIGS. 1 through 10 that may capture depth images from a field illuminated by a projection system 2092.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2022, which may be processor-executable to implement any element or action to support an integrated projection system 2092 and camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, projection systems, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A projection system, comprising:
   a light source;
   a lens system comprising:
      a lens stack comprising a field lens and a collimating lens; and
      a light folding element; and
   a diffractive beam splitter;
   wherein the lens stack refracts light emitted by the light source on a first optical axis to the light folding element;
   wherein the light folding element redirects the light received from the lens stack to the diffractive beam splitter on a second optical axis; and
   wherein the diffractive beam splitter replicates the light to generate a larger field of view for the projection system than an internal field of view of the lens system.

2. The projection system as recited in claim 1, wherein the field lens has at least one aspheric surface to correct for distortion and telecentricity.

3. The projection system as recited in claim 1, wherein the collimating lens has at least one aspheric surface to define diameter of an exit pupil of the lens system, object divergence, and minimal spot diameter of the object.

4. The projection system as recited in claim 1, further comprising a refractive lens with at least one aspheric surface located between the field lens and the collimating lens to correct image quality across a field of view of the lens system.

5. The projection system as recited in claim 1, wherein effective focal length of the lens system is within a range of 2.7 to 3.3 millimeters.

6. The projection system as recited in claim 1, wherein an exit pupil of the lens system is at or near a diffractive surface of the beam splitter.

7. The projection system as recited in claim 1, wherein maximum Z height of the projection system is within a range of 1.7 to 4 millimeters, and wherein maximum clear aperture of the lenses in the lens stack is within a range of 1.5 to 3.8 millimeters.

8. The projection system as recited in claim 1, wherein maximum Z height of the projection system is within a range of 1.75 to 2.1 millimeters, and wherein maximum clear aperture of the lenses in the lens stack is within a range of 1.6 to 1.75 millimeters.

9. The projection system as recited in claim 1, wherein the lenses in the lens stack include at least one injection molded optical plastic lens.

10. The projection system as recited in claim 1, wherein the lenses in the lens stack include at least one epoxy deposited glass wafer lens.

11. The folded projection system as recited in claim 1, wherein the lenses in the lens stack include at least one molded glass wafer lens.

12. The projection system as recited in claim 1, wherein the lenses in the lens stack include at least one sectioned lens.

13. The projection system as recited in claim 1, wherein the light source is a vertical-cavity surface-emitting laser (VCSEL) array.

14. The projection system as recited in claim 1, wherein the light folding element is a prism composed of a plastic or glass material with a refractive index that positions an exit pupil of the lens system at an active diffractive surface of the diffractive beam splitter.

15. A lens system, comprising:
a lens stack comprising:
a field lens with at least one aspheric surface to correct for distortion and telecentricity; and
a collimating lens with at least one aspheric surface to define diameter of an exit pupil of the lens system, object divergence, and minimal spot diameter of the object; and
a light folding element;
wherein the lens stack refracts light emitted by a light source on a first optical axis to the light folding element; and
wherein the light folding element redirects the light received from the lens stack to a diffractive beam splitter on a second optical axis.

16. The lens system as recited in claim 15, wherein the lens stack further comprises a refractive lens with at least one aspheric surface located between the field lens and the collimating lens to correct image quality across a field of view of the lens system.

17. The lens system as recited in claim 15, wherein the light folding element is a prism composed of a plastic or glass material with a refractive index that positions an exit pupil of the lens system at an active diffractive surface of the diffractive beam splitter.

18. The lens system as recited in claim 15, wherein maximum clear aperture of the lenses in the lens stack is within a range of 1.5 to 3.8 millimeters.

19. The lens system as recited in claim 15, wherein effective focal length of the lens system is within a range of 2.7 to 3.3 millimeters.

20. The projection system as recited in claim 15, wherein the light source is a laser light source.

* * * * *